|  |

United States Patent
Agirman et al.

(10) Patent No.: US 10,513,413 B2
(45) Date of Patent: Dec. 24, 2019

(54) PWM STRATEGY FOR REGENERATIVE MULTILEVEL DRIVE

(71) Applicant: OTIS ELEVATOR COMPANY, Farmington, CT (US)

(72) Inventors: Ismail Agirman, Southington, CT (US); Shashank Krishnamurthy, Rocky Hill, CT (US); Prasanna Nagarajan, Farmington, CT (US); Hanjong Kim, Avon, CT (US); Yang Wang, East Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/103,502

(22) PCT Filed: Dec. 18, 2013

(86) PCT No.: PCT/US2013/076204
§ 371 (c)(1),
(2) Date: Jun. 10, 2016

(87) PCT Pub. No.: WO2015/094240
PCT Pub. Date: Jun. 25, 2015

(65) Prior Publication Data
US 2016/0311644 A1     Oct. 27, 2016

(51) Int. Cl.
*B66B 1/30*         (2006.01)
*H02P 27/08*        (2006.01)
(Continued)

(52) U.S. Cl.
CPC ............... *B66B 1/302* (2013.01); *B66B 9/00* (2013.01); *B66B 11/043* (2013.01); *H02M 7/487* (2013.01); *H02P 27/08* (2013.01)

(58) Field of Classification Search
USPC ....................................................... 187/289
See application file for complete search history.

(56) References Cited

U.S. PATENT DOCUMENTS 5,321,599 A * 6/1994 Tanamachi ............ H02M 7/487
                                                   318/811
5,587,891 A   12/1996 Nakata et al.
(Continued)

FOREIGN PATENT DOCUMENTS

CN        1077064 A      10/1993
CN        1083985 A      3/1994
(Continued)

OTHER PUBLICATIONS

International Search Report and the Written Opinion for application PCT/US2013/076204; dated Sep. 16, 2014, 15 Pages.
(Continued)

*Primary Examiner* — Christopher Uhlir
(74) *Attorney, Agent, or Firm* — Cantor Colburn LLP

(57) ABSTRACT

A method (70) for controlling a multilevel regenerative drive (30) having a converter (32) and an inverter (34) is disclosed. The method (70) may include applying at least one of unipolar modulation and bipolar modulation to the converter (32), and applying at least one of unipolar modulation and bipolar modulation to the inverter (34). A control system (52) for a mechanical system (20) having a motor (28) is also disclosed. The control system (52) may comprise a converter (32) operatively connected to a power source (29), and an inverter (34) operatively connected to the motor (28) of the mechanical system (20). At least one controller may be in communication with the converter (32) and inverter (34), and may be configured to apply at least one of unipolar modulation and bipolar modulation to each of the converter (32) and the inverter (34).

10 Claims, 9 Drawing Sheets

(51) Int. Cl.
  *B66B 9/00* (2006.01)
  *B66B 11/04* (2006.01)
  *H02M 7/487* (2007.01)

(56) References Cited

U.S. PATENT DOCUMENTS

| | | | |
|---|---|---|---|
| 6,476,571 B1* | 11/2002 | Sasaki | B60K 6/26 |
| | | | 180/65.1 |
| 7,880,419 B2 | 2/2011 | Sihler et al. | |
| 7,936,083 B2 | 5/2011 | Stancu et al. | |
| 8,242,731 B2* | 8/2012 | Daboussi | G05B 11/28 |
| | | | 318/599 |
| 2006/0250107 A1 | 11/2006 | Jadric et al. | |
| 2009/0218175 A1 | 9/2009 | Wesson et al. | |
| 2011/0101898 A1* | 5/2011 | Shinomoto | H02M 1/126 |
| | | | 318/400.3 |
| 2011/0247900 A1* | 10/2011 | Blasko | B66B 1/302 |
| | | | 187/247 |

FOREIGN PATENT DOCUMENTS

| | | |
|---|---|---|
| CN | 101953062 A | 1/2011 |
| CN | 202535291 U | 11/2012 |
| JP | 2006014532 A | 1/2006 |
| JP | 2011030380 A | 2/2011 |
| JP | 20110303880 A | 2/2011 |
| KR | 100739391 B1 | 7/2007 |
| KR | 1020130019897 A | 2/2013 |
| WO | 2013151542 A1 | 10/2013 |

OTHER PUBLICATIONS

Australian Office Action for application AU 2013408357, dated Sep. 6, 2016, 4 pages.
European Search Report for application EP 13899621, dated Sep. 19, 2017, 9 pgs.
CN First Office Action and English Translation; Application No. CN 201380081743.X; dated Dec. 20, 2017; 25 pages.
CN Second Office Action and English Translation; Application No. 201380081743.X; dated Sep. 19, 2018; 24 pages.
Li et al.; "Power Electronic Converter Technology in Wind Power Generation"; China Machine Press; Oct. 31, 2008; 20 pages.
CN Fourth Office Action and English Translation; Application No. CN 201380081743.X; dated Aug. 28, 2019; 12 pages.

\* cited by examiner

PWM STRATEGY FOR REGENERATIVE MULTILEVEL DRIVE

FIELD OF THE DISCLOSURE

The present disclosure relates generally to elevator systems and, more particularly, to a control system and method for an elevator system.

BACKGROUND OF THE DISCLOSURE

Elevator systems typically include an elevator car positioned in a hoistway for carrying passengers and loads between various floors of a building. Elevator systems also include motors, which provide the requisite thrust force to move the elevator cars within the hoistways. Regenerative drives may be used to achieve desired elevator car movement and to generate electricity.

Regenerative drives may typically include a converter on the input or power utility grid side and an inverter on the motor side. In the design of the regenerative drive, power demand of the inverter is generally matched by an appropriate power capability of the converter on the input side. Power demands for operating elevators range from positive to negative. With positive power demands, externally generated power, such as power from a power utility grid, is used. With negative power demands, the load in the elevator drives the motor so it produces electricity as a generator. Use of the motor to produce electricity as a generator is sometimes referred to as regeneration. Regenerative drives may operate on a three-phase power input. In addition, regenerative drives may be multilevel with a multilevel converter and a multilevel inverter.

Management of acoustic noise, efficiency, neutral point stability and thermal balancing in the regenerative drive may be challenging. Accordingly, there exists a need for a control system and method that deliver beneficial results in acoustic noise, efficiency, neutral point stability and thermal balancing.

SUMMARY OF THE DISCLOSURE

An exemplary embodiment of the present disclosure is directed to a method for controlling a multilevel regenerative drive having a converter and an inverter. The method may comprise applying at least one of unipolar modulation and bipolar modulation to the converter, and applying at least one of unipolar modulation and bipolar modulation to the inverter.

Another exemplary embodiment is directed to a control system for a mechanical system having a motor. The control system may comprise a converter operatively connected to a power source. The converter may have a plurality of devices in selective communication with the power source. The control system may further comprise an inverter operatively connected to the motor of the mechanical system. The inverter and the converter may be connected to each other, and the inverter may have a plurality of devices in selective communication with the motor. The control system may further comprise at least one controller in communication with the converter and the inverter. The at least one controller may be configured to apply at least one of unipolar modulation and bipolar modulation to each of the converter and the inverter.

Another exemplary embodiment is directed to an elevator system. The elevator system may comprise an elevator car disposed in a hoistway, and a motor operatively connected to the elevator car. The motor may generate a thrust force to move the elevator car within the hoistway. The elevator system may further comprise a power source operatively connected to the motor. The power source may supply power to the motor. The elevator system may further comprise a converter operatively connected to the power source, and an inverter operatively connected to the motor. The converter may have a plurality of devices in selective communication with the power source. The inverter and the converter may be connected to each other, and the inverter may have a plurality of devices in selective communication with the motor. The elevator system may further comprise at least one controller in communication with the converter and the inverter. The at least one controller may be configured to selectively apply pulse width modulation to the converter and the inverter in at least one of a unipolar mode and a bipolar mode.

Although various features are disclosed in relation to specific exemplary embodiments, it is understood that the various features may be combined with each other, or used alone, with any of the various exemplary embodiments without departing from the scope of the disclosure. For example, the applying at least one of unipolar modulation and bipolar modulation to the converter may comprise applying unipolar modulation to the converter. The applying at least one of unipolar modulation and bipolar modulation to the inverter may comprise applying bipolar modulation to the inverter. In another refinement, the applying at least one of unipolar modulation and bipolar modulation to the inverter may comprise applying bipolar modulation to the inverter during a first period, and applying unipolar modulation to the inverter during a second period, wherein the first period may precede or follow the second period. In another refinement, the applying at least one of unipolar modulation and bipolar modulation to the inverter may comprise applying bipolar modulation to the inverter during acceleration and applying unipolar modulation to the inverter during constant velocity.

In another example, the applying at least one of unipolar modulation and bipolar modulation to the converter may comprise applying bipolar modulation to the converter. The applying at least one of unipolar modulation and bipolar modulation the converter may comprise applying bipolar modulation to the converter during a first period, and applying unipolar modulation to the converter during a second period, wherein the applying at least one of unipolar modulation and bipolar modulation to the inverter may comprise applying bipolar modulation to the inverter during a third period, and applying unipolar modulation to the inverter during a fourth period, and wherein the first period, the second period, the third period, and the fourth period may occur in any temporal order and may overlap partially or entirely.

The method may further comprise providing the converter and the inverter with a neutral-point-clamped topology, a T-type topology, or a reverse blocking insulated gate bipolar transistor based topology. The mechanical system may be an elevator system. In another example, the at least one controller may be further configured to apply unipolar modulation to the converter and apply bipolar modulation to the inverter. The at least one controller may be further configured to apply unipolar modulation to the converter, and apply both unipolar and bipolar modulation to the inverter. The at least one controller may be further configured to apply bipolar modulation to the inverter during acceleration of an elevator car within a range of zero to a predetermined rated speed, and apply unipolar modulation to the inverter during constant speed and acceleration of the elevator car within a range of the predetermined rated speed to the constant speed.

These and other aspects and features will become more readily apparent upon reading the following detailed description when taken in conjunction with the accompanying drawings.

While the present disclosure is susceptible to various modifications and alternative constructions, certain illustrative embodiments thereof, will be shown and described below in detail. It should be understood, however, that there is no intention to be limited to the specific embodiments disclosed, and the intention is to cover all modifications, alternative constructions, and equivalents along within the spirit and scope of the present disclosure.

DETAILED DESCRIPTION

Figure 1:
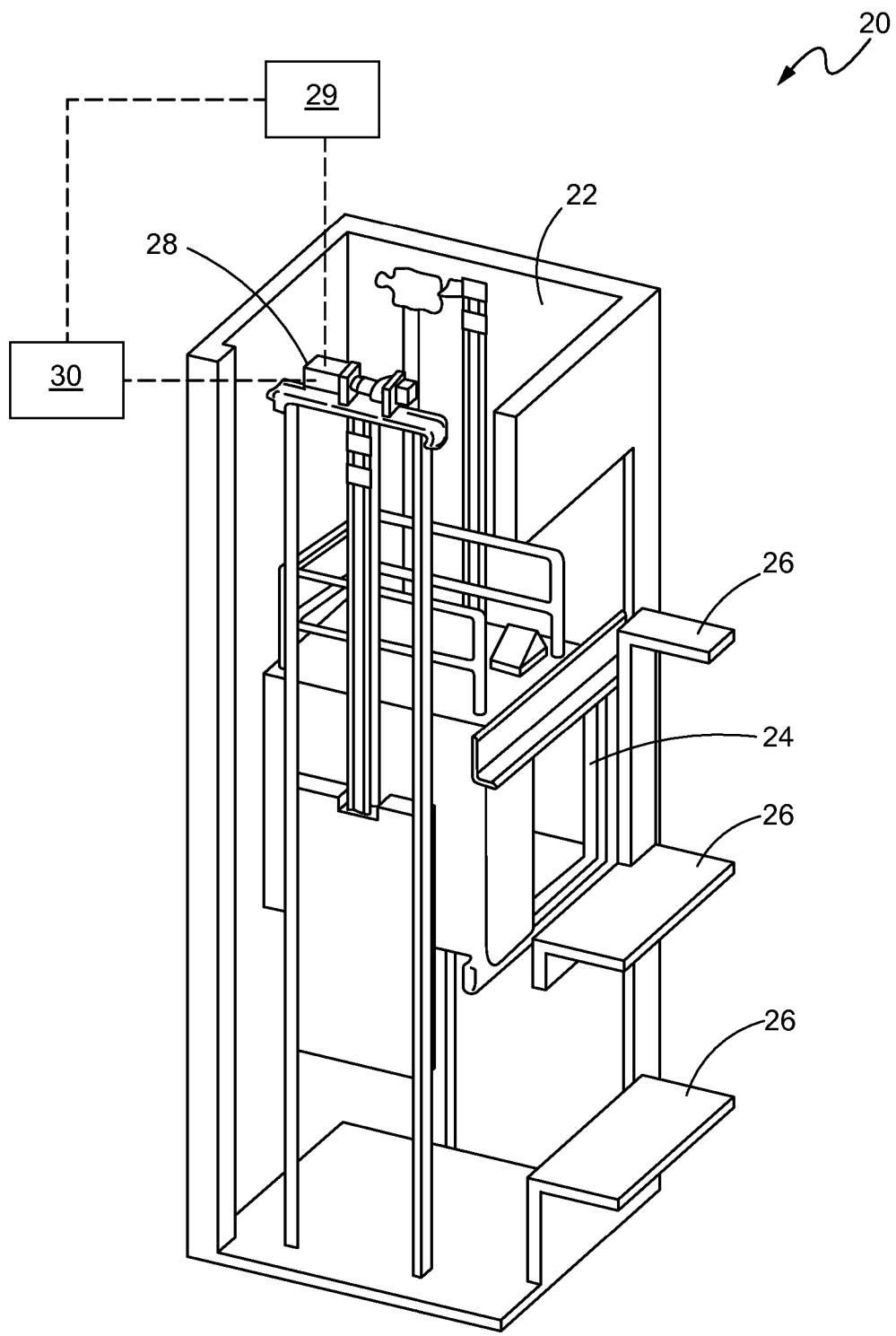
FIG. 1 is a schematic representation of an elevator system, according to an exemplary embodiment of the invention.

Referring now to the drawings, and with specific reference to FIG. 1, a schematic diagram of an elevator system 20 is provided, according to an exemplary embodiment. It is to be understood that the version of the elevator system 20 shown in FIG. 1 is for illustrative purposes only and to assist in disclosing various embodiments of the invention. As is understood by a person skilled in the art, FIG. 1 does not depict all of the components of an exemplary elevator system, nor are the depicted features necessarily included in all elevator systems.

As shown in FIG. 1, the elevator system 20 may reside fully or partially in a hoistway 22 that is vertically disposed within a building. The hoistway 22 may provide a vertical path through which an elevator car 24 may travel between floors or landings 26 of the building. A motor 28, or other prime mover, may be operatively connected to the elevator car 24 in order to generate a thrust force to move the elevator car 24 within the hoistway 22. The motor 28 may also be referred to as a machine, or in alternate configurations, the motor 28 may be part of a machine that is used to move an elevator car 24.

Figure 2:
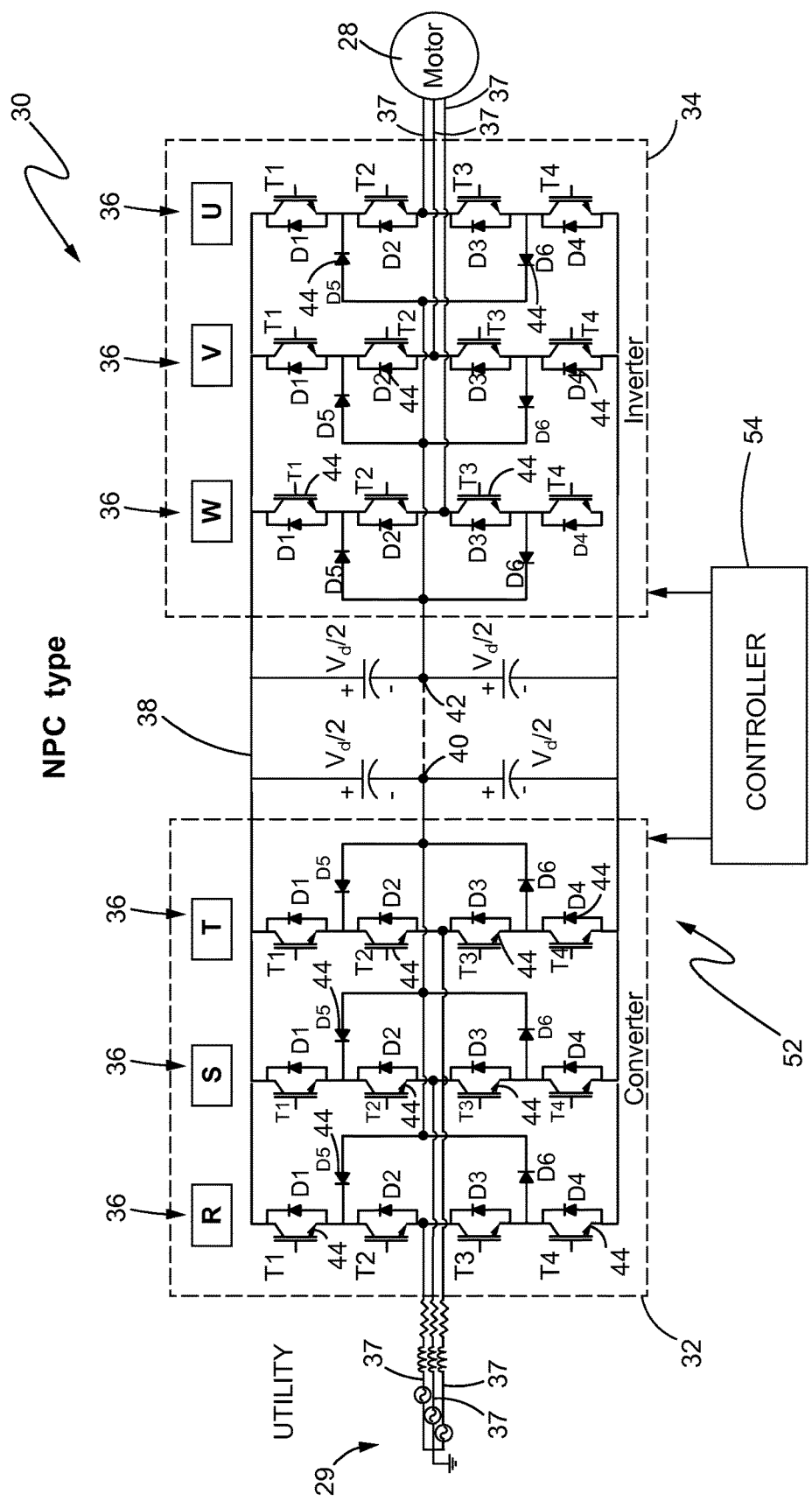
FIG. 2 is a schematic representation of a neutral-point-clamped (NPC) regenerative drive for the elevator system of FIG. 1 according to an exemplary embodiment of the invention.

A power source 29 (as shown in FIG. 2) may be operatively connected to the motor 28 in order to supply power to the motor. The power source 29 may be externally generated power, such as from a power utility grid. The motor 28 and power source 29 may each be three-phase. In addition, a regenerative drive 30 may be coupled to the motor 28 and power source 29 in order to operate the motor 28 to achieve the desired elevator car movement.

Referring now to FIGS. 2-7 with continued reference to FIG. 1, the regenerative drive 30 may include a converter 32 on the input or power utility grid side and an inverter 34 on the motor side. More specifically, the converter 32 may be operatively connected to the power source 29 and may have a phase-leg 36 for each phase 37 of the power source 29. The inverter 34 may be operatively connected to motor 28 and may have a phase-leg 36 for each phase 37 of the motor 28. In this example, since the power source 29 and motor 28 are each three phase, the converter 32 and the inverter 34 each have three phase-legs 36. In addition, the converter 32 and the inverter 34 may be connected to each other, such as, by way of upper direct current (DC) bus 38 and lower DC bus 39. A neutral point 40 of the converter 32 may or may not be connected to a neutral point 42 of the inverter 34.

Furthermore, each phase-leg R, S, T of the converter 32 may have a plurality of devices 44 in selective communication with each phase 37 of the power source 29, and each phase-leg W, V, U of the inverter 34 may have a plurality of devices 44 in selective communication with each phase 37 of the motor 28. More specifically, the plurality of devices 44 in the converter 32 and inverter 32 may include a plurality of insulated gate bipolar transistors (IGBTs) T1-T4 and a plurality of diodes D1-D6. The regenerative drive 30 may be a multilevel drive having a multilevel converter 32 and a multilevel inverter 34. In this example, the regenerative drive 30 may be a three-level drive with a three-level converter 32 and a three-level inverter 34. More specifically, each phase-leg 36 of the converter 32 and inverter 34 may output three levels of voltage, e.g., a positive voltage, a neutral point voltage, and a negative voltage.

Figure 3:
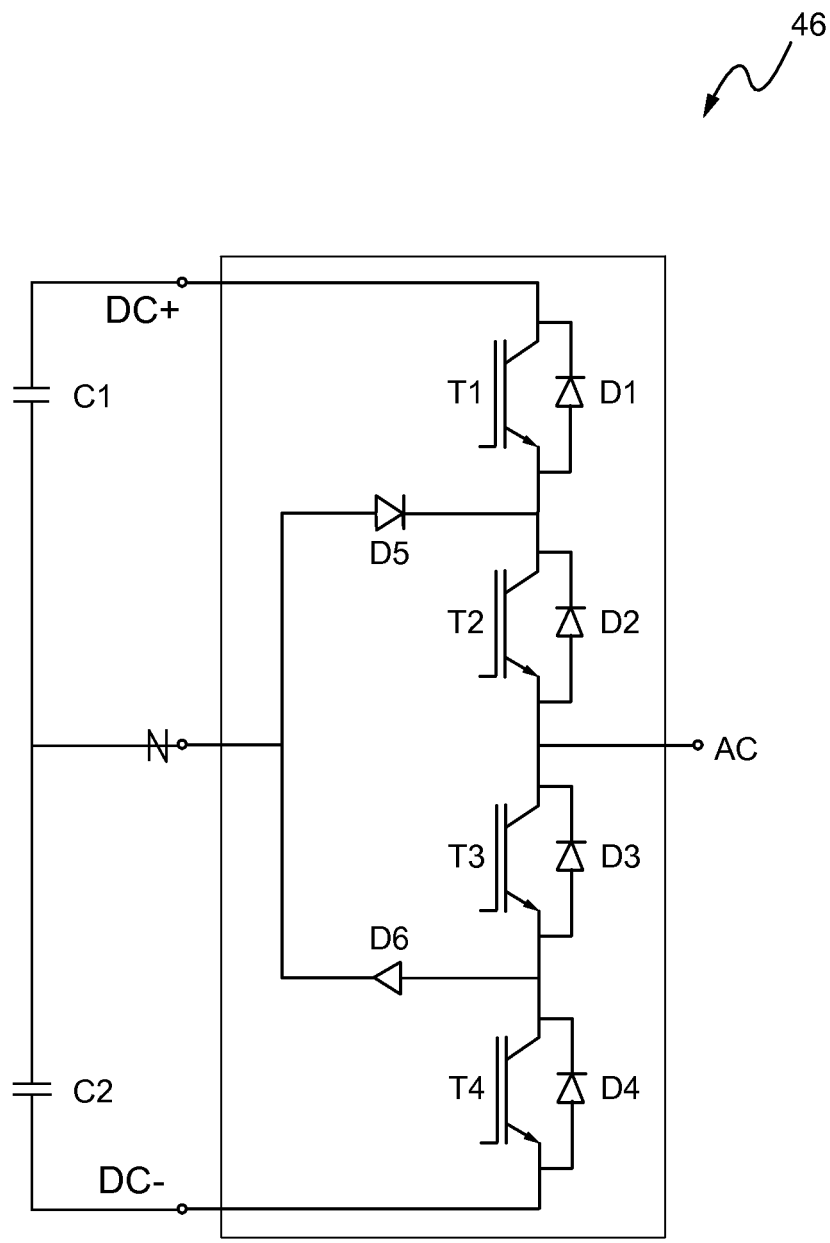
FIG. 3 is a schematic representation of a phase-leg of an inverter or converter of the regenerative drive of FIG. 2 according to an exemplary embodiment of the invention.
Figure 4:
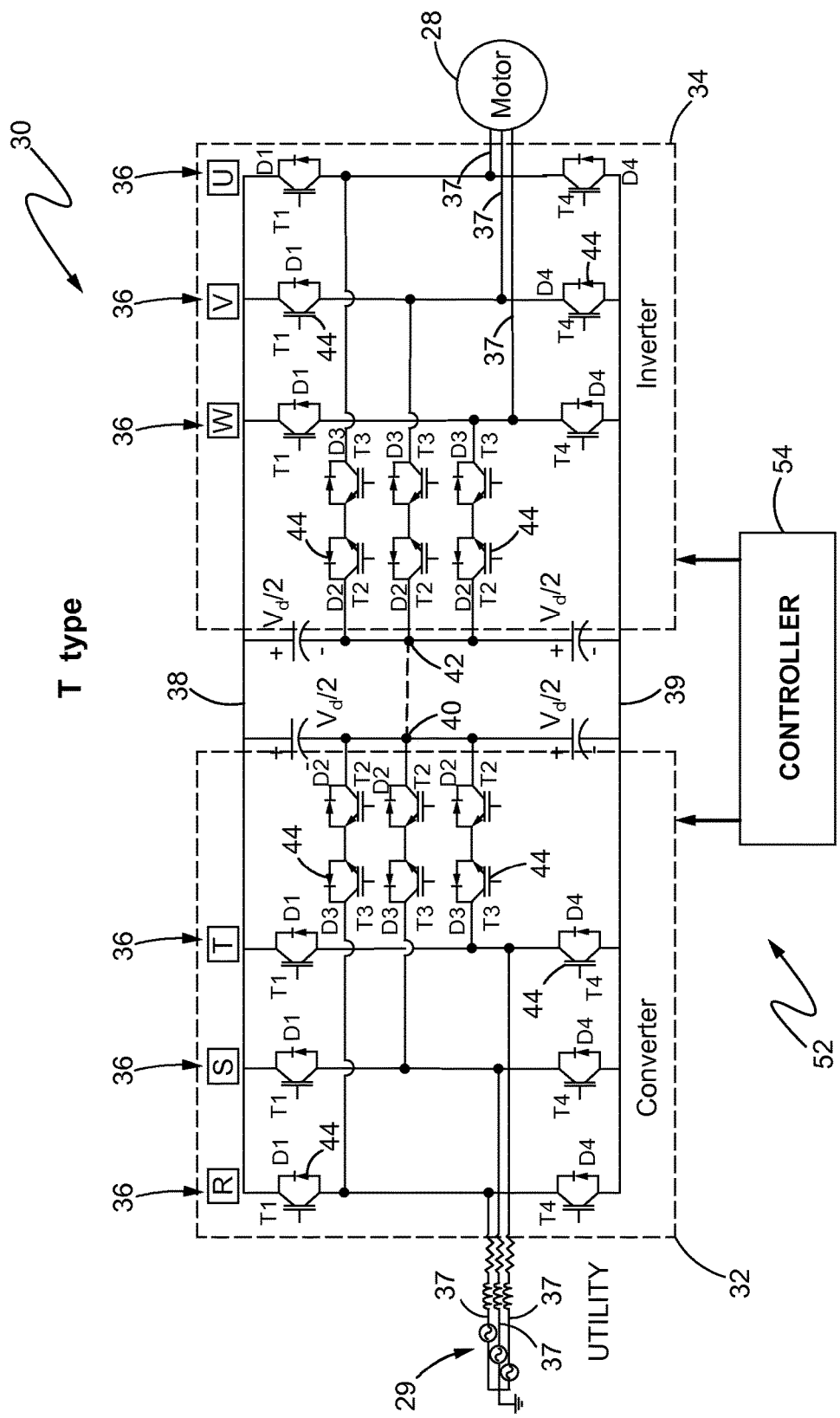
FIG. 4 is a schematic representation of a T-type regenerative drive for the elevator system of FIG. 1 according to an exemplary embodiment of the invention.

As shown best in FIGS. 2 and 3, each phase-leg 36 of the converter 32 and inverter 34 may have a neutral-point-clamped (NPC-type) topology 46. In an embodiment shown best in FIGS. 4 and 5, each phase-leg 36 of the converter 32 and inverter 34 may have a T-type topology 48. In an embodiment shown best in FIGS. 6 and 7, each phase-leg 36 of the converter 32 and inverter 34 may have an AT NPC-type or reverse blocking IGBT based topology 50. In all topologies, each phase-leg 36 may include four IGBTs T1-T4.

A control system 52 may be used to control the converter 32 and inverter 34. The control system 52 may comprise a controller 54 operatively connected to the converter 32 and inverter 34. For example, the controller 54 may be connected to a driver circuit, which may send logic signals to each of the IGBTs T1-T4 in the converter 32 and inverter 34. Although the controller 54 is shown and described as applying to both the converter 32 and inverter 34, it is to be understood that there may be two separate controllers instead of one controller, e.g., one controller for the converter 32 and one controller for the inverter 34. The controller 54 may comprise a processor (e.g., "computer processor") or processor-based device that may include or be associated with a non-transitory computer readable storage medium having stored thereon computer-executable instructions. It is understood that the control system 52 and controller 54 may include other hardware, software, firmware, or combinations thereof.

The controller 54 may be programmed to apply pulse width modulation (PWM) to the converter 32 and inverter 34. PWM is a modulation technique that is used to control the power supplied to the motor 28. With a multilevel regenerative drive 30, e.g., the three-level converter 32 and three-level inverter 34, the controller 54 may apply PWM in two modes: unipolar and bipolar. Unipolar modulation comprises switching of only one pair of IGBTs, T1 and T3, or T2 and T4, during one PWM cycle, when applied to a phase-leg 36 of the converter 32 or inverter 34. With unipolar modulation, an output alternative current (AC) voltage may range either from a neutral potential to a positive potential or from the neutral potential to a negative potential. Unipolar modulation may provide efficiency and acoustic performance benefits.

Figure 5:
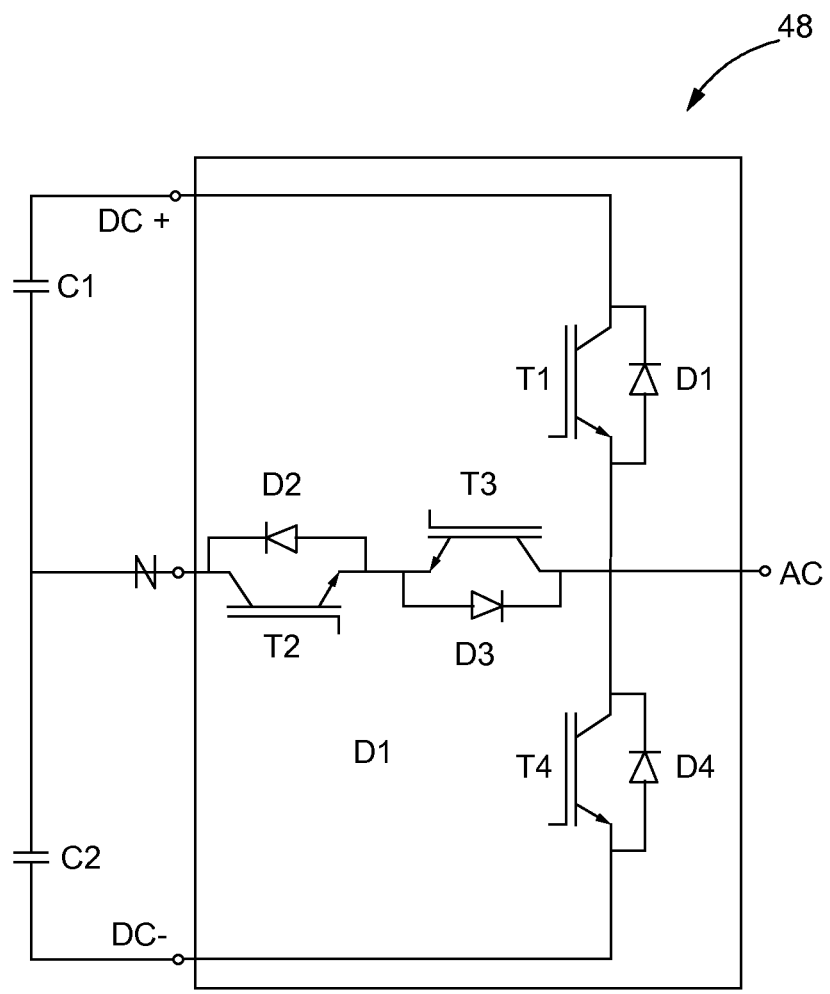
FIG. 5 is a schematic representation of a phase-leg of an inverter or converter of the regenerative drive of FIG. 4 according to an exemplary embodiment of the invention.
Figure 6:
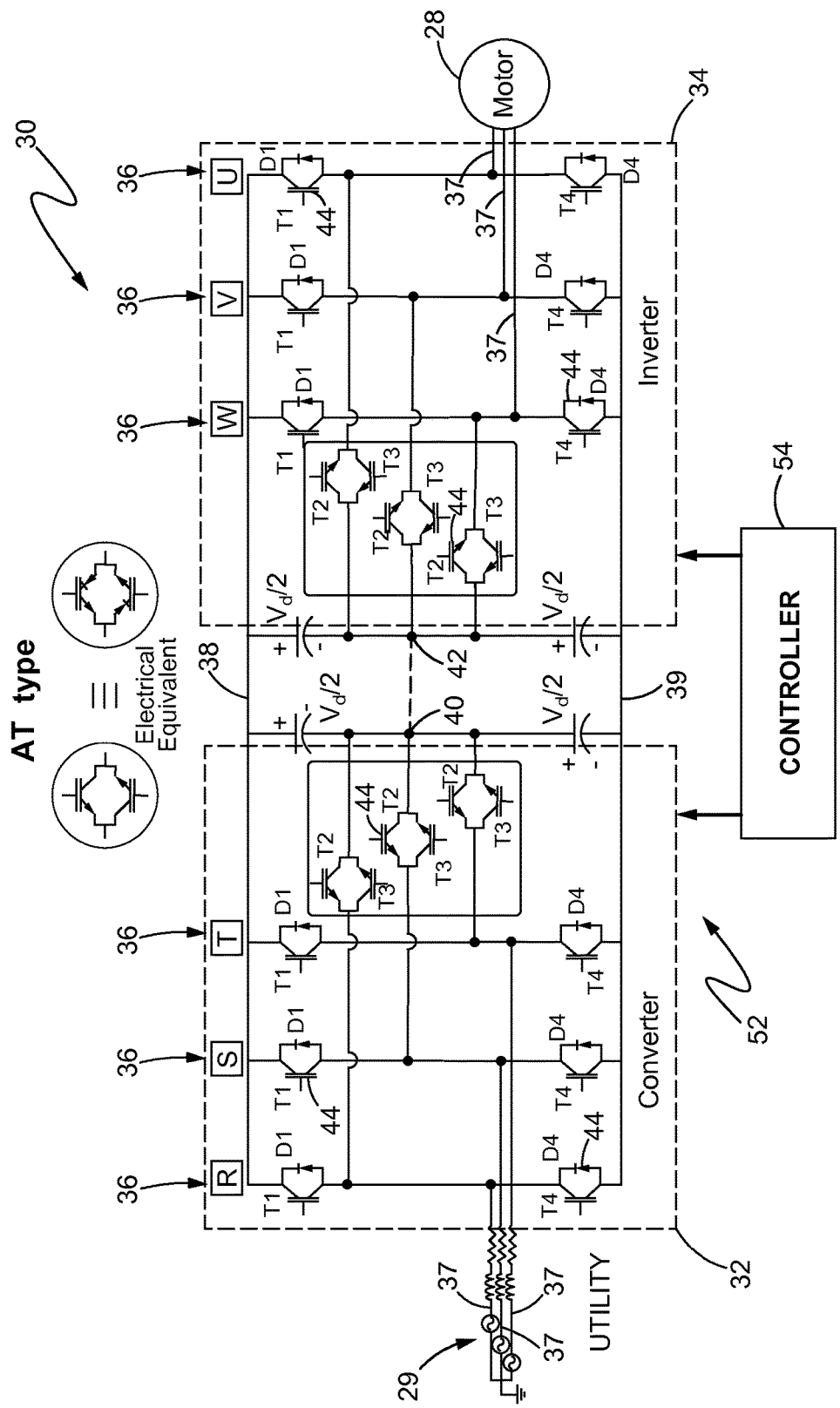
FIG. 6 is a schematic representation of a reverse-blocking insulated gate bipolar transistor (IGBT) based regenerative drive for the elevator system of FIG. 1 according to an exemplary embodiment of the invention.
Figure 7:
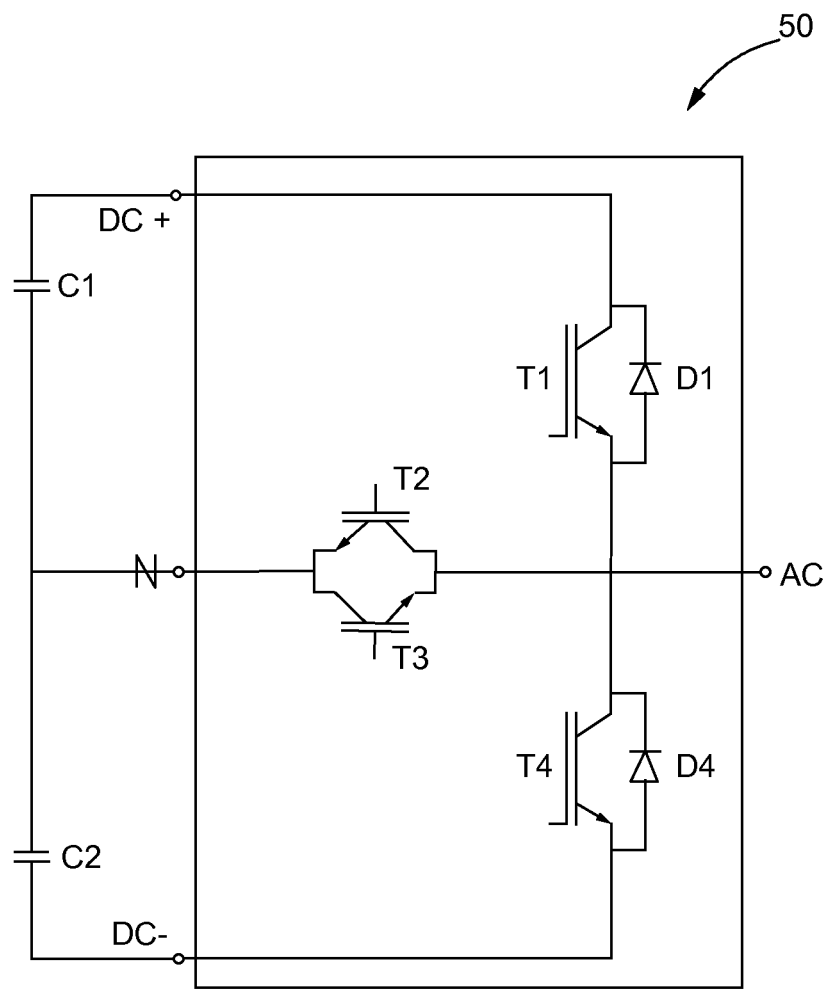
FIG. 7 is a schematic representation of a phase-leg of an inverter or converter of the regenerative drive of FIG. 6 according to an exemplary embodiment of the invention.
Figure 8:
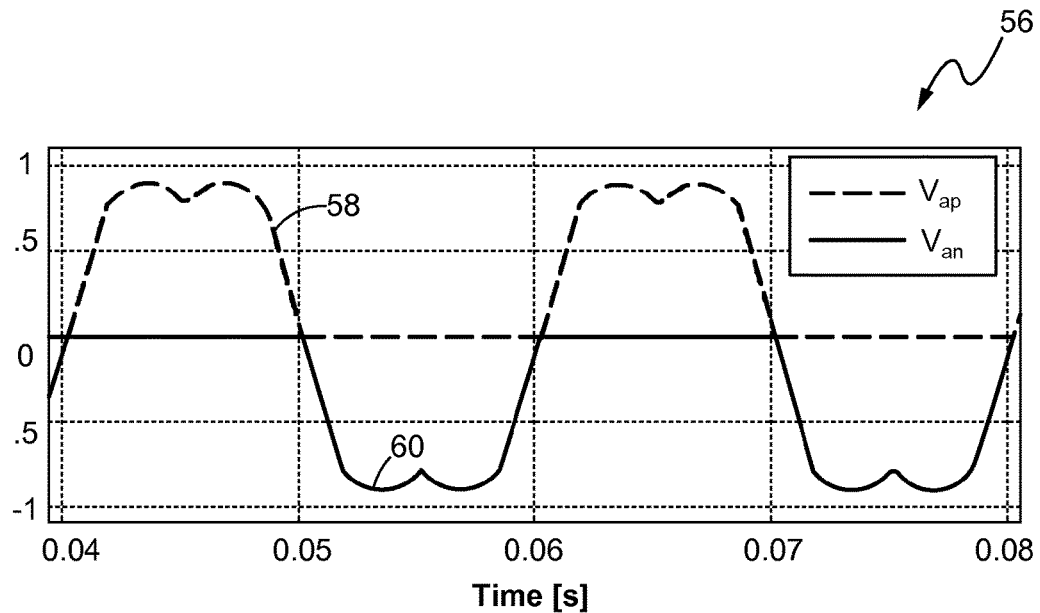
FIG. 8 is a graph of a unipolar modulation waveform of a phase-leg of FIG. 3, 5, or 7 according to various exemplary embodiments of the invention.

FIG. 8 illustrates a resulting unipolar modulation waveform 56 applied to the inverter/converter phase-legs of FIG. 3, 5, or 7. IGBTs T1 and T3 may be utilized for synthesizing the positive part of the AC voltage while T2 is on and T4 is off, and IGBTs T2 and T4 may be utilized for synthesizing the negative part of the AC voltage while T1 is off and T3 is on. As shown in the unipolar modulation waveform 56, a positive part 58 controls the switching of IGBTs T1 and T3, while a negative part 60 controls the switching of IGBTs T2 and T4.

For unipolar modulation, when one pair of IGBTs, T1 and T3, is switching, the other pair of IGBTs, T2 and T4, is not switching, and vice versa. As shown in the unipolar modulation waveform 56, when the positive modulation waveform 58 (switching of IGBTs T1 and T3) is nonzero, the negative modulation waveform 60 (switching of IGBTs T2 and T4) is zero. Similarly, when the negative modulation waveform 60 (switching of IGBTs T2 and T4) is nonzero, the positive modulation waveform 58 (switching of IGBTs T1 and T3) is zero.

Bipolar modulation comprises switching of all IGBTs T1-T4 during one PWM cycle, when applied to a phase-leg 36 of the converter 32 or inverter 34. Switching all four devices T1-T4 during one PWM cycle may achieve neutral point regulation. With bipolar modulation, the output AC voltage may range from a positive potential to a negative potential. Bipolar modulation may provide neutral point stability and thermal balancing benefits. Neutral point control may result in improved ride quality of the elevator system 20, while improved thermal balancing across the devices may result in a longer part life.

Figure 9:
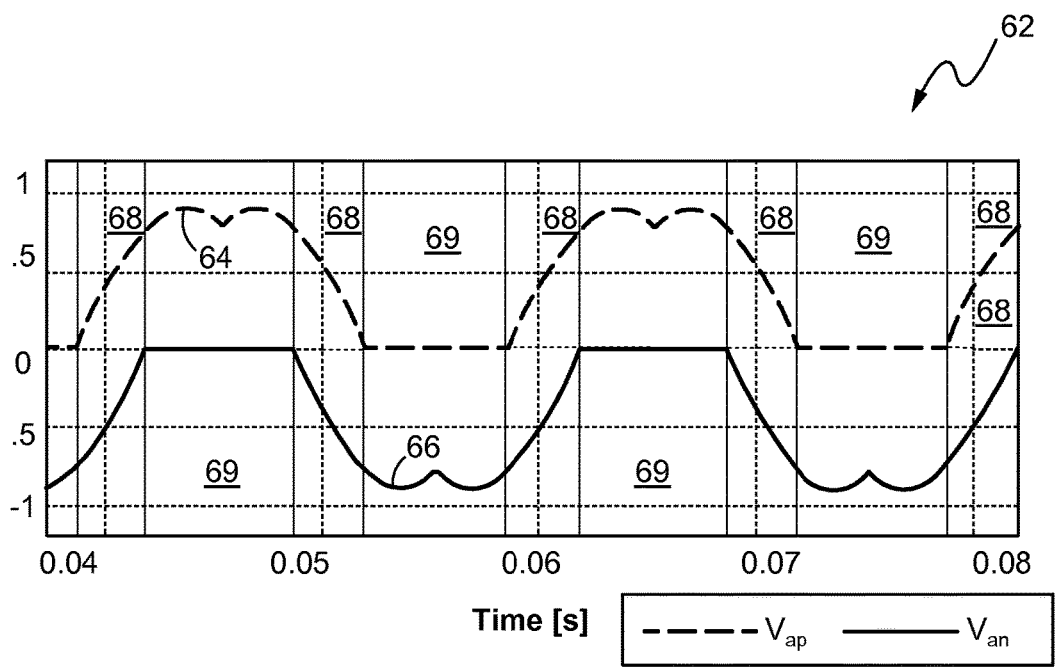
FIG. 9 is a graph of a bipolar modulation waveform of a phase-leg of FIG. 3, 5, or 7 according to various exemplary embodiments of the invention.

FIG. 9 illustrates a resulting bipolar modulation waveform 62 applied to the inverter/converter phase-legs of FIG. 3, 5, or 7. IGBTs T1 and T3 may be utilized for synthesizing the positive part of the AC voltage while T2 is on and T4 is off, and IGBTs T2 and T4 may be utilized for synthesizing the negative part of the AC voltage while T1 is off and T3 is on. As shown in the bipolar modulation waveform 62, a positive part 64 controls the switching of IGBTs T1 and T3, while a negative part 66 controls the switching of IGBTs T2 and T4.

For bipolar modulation, in areas 68 of the modulation waveform 62, all four IGBTs T1-T4 may switch during one PWM cycle. Both the positive modulation waveform 64 (switching of IGBTs T1 and T3) and the negative modulation waveform 66 (switching of IGBTs T2 and T4) are nonzero in areas 68. In areas 69 of the bipolar modulation waveform 62, one pair of devices (either IGBTs T1 and T3, or IGBTs T2 and T4) may switch during one PWM cycle. The same fundamental component of output voltage can be achieved using bipolar and unipolar modulation techniques.

The controller 54 may be configured to apply unipolar and/or bipolar modulation to every phase-leg 36 of the converter 32 and to simultaneously apply unipolar and/or bipolar modulation to every phase-leg 36 of the inverter 34. For example, the controller 54 may apply unipolar modulation to the converter 32 and bipolar modulation to the inverter 34. In so doing, the elevator system 20 may have an enhanced acoustic performance and efficiency in the converter 32, while achieving increased neutral point control and thermal balancing in the inverter 34.

In another example, the controller 54 may apply unipolar modulation to the converter 32 and a mixture of bipolar modulation and unipolar modulation to the inverter 34. For example, the controller 54 may apply bipolar modulation to the inverter 34 during acceleration of the elevator car 24. Acceleration may include positive acceleration and negative acceleration (deceleration). When the elevator car 24 is moving at constant velocity, then the controller 54 may apply unipolar modulation to the inverter 34. In so doing, the elevator system 20 may have an enhanced acoustic performance and efficiency in the converter 32, while achieving increased neutral point control and thermal balancing in the inverter 34. Furthermore, during constant velocity of the elevator car 24, efficiency may increase and acoustic noise may decrease due to the application of unipolar modulation to the inverter 34.

Furthermore, the controller 54 may be programmed to apply bipolar modulation to the inverter 34 during acceleration of the elevator car 24 within a certain range, such as, a range of zero to a predetermined rated speed. The predetermined rated speed may be approximately seventy-five percent (75%) of the rated speed, although other values may certainly be used. The controller 54 may also be programmed to apply unipolar modulation to the inverter 34 during acceleration of the elevator car 24 within a range of the predetermined rated speed (e.g., 75% of the rated speed) to the rated or constant speed and throughout movement of the elevator car 24 at the constant speed.

In another example, the controller 54 may apply bipolar modulation to the converter 32 and bipolar modulation to the inverter 34. This configuration may provide enhanced neutral point control for both the converter 32 and the inverter 34, which results in improved ride quality performance of the elevator system 20. Furthermore, there may be improved thermal balancing across the IGBTs T1-T4 due to the application of bipolar modulation, which results in an improved size selection for the IGBTs.

It is to be understood that other configurations, such as, without limitation, unipolar modulation in the converter 32 and unipolar modulation in the inverter 34, bipolar modulation in the converter 32 and unipolar modulation in the inverter 32, mixed unipolar and bipolar modulation in the converter 32 and mixed unipolar and bipolar modulation in the inverter 32, may certainly be used.

Figure 10:
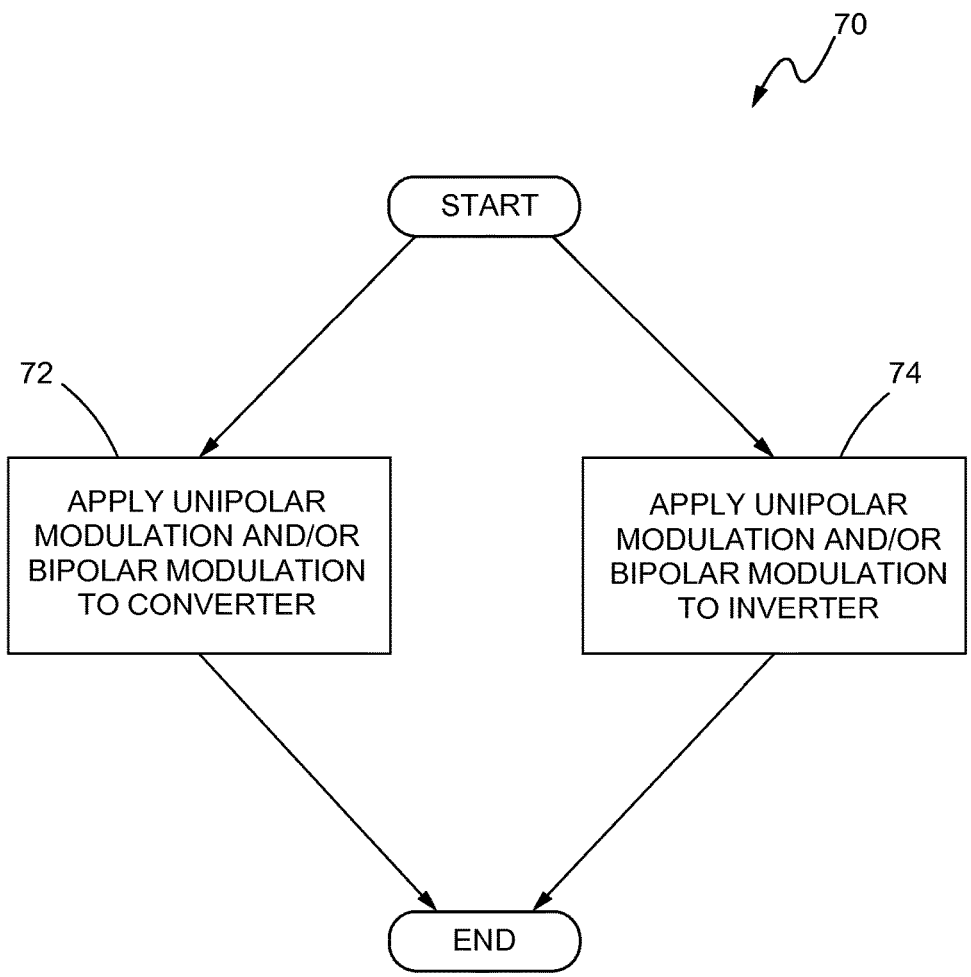
FIG. 10 is a flowchart illustrating an exemplary process for controlling a multilevel regenerative drive, according to an exemplary embodiment of the invention.

Turning now to FIG. 10, with continued reference to FIGS. 1-9, an exemplary process 70 for controlling the multilevel regenerative drive 30 is shown. The regenerative drive 30 may include the three-level converter 32 and the three-level inverter 34. At block 72, unipolar and/or bipolar modulation may be applied to the converter 32. Simultaneously, at block 74, unipolar and/or bipolar modulation may be applied to the inverter 34.

INDUSTRIAL APPLICABILITY

From the foregoing, it can be seen that the teachings of this disclosure can find industrial or commercial applications, such as, including but not limited to, control systems for regenerative drives. Such control systems may be used, for example, in traction applications, such as, including but not limited to, elevator systems. It is understood that the disclosed control system and method may be used for other mechanical systems than elevator systems as well.

The described disclosure provides a control system and method for a multilevel (e.g., three-level) regenerative drive having a multilevel (e.g., three-level) converter and a multilevel (e.g., three-level) inverter. The disclosed control system and method applies unipolar and bipolar modulation to the converter and the inverter in order to achieve certain benefits in the elevator system. Unipolar modulation applied to the converter and/or inverter provides for improved efficiency and decreased ripple/acoustic noise, which enhances the elevator system's acoustic performance. Bipolar modulation applied to the converter and/or inverter provides for re-distribution of thermal heat across the devices, or thermal balancing, which thereby results in a longer part life of the regenerative drive. In addition, bipolar modulation allows for tighter neutral voltage control, which improves ride quality of the elevator system.

While the foregoing detailed description has been given and provided with respect to certain specific embodiments, it is to be understood that the scope of the disclosure should not be limited to such embodiments, and that the same are provided simply for enablement and best mode purposes. The breadth and spirit of the present disclosure is broader than the embodiments specifically disclosed and encompassed within the claims appended hereto. It is understood that features described with relation to a specific embodiment may be used with alternate embodiments where practicable.

What is claimed is:

1. A method for controlling a multilevel regenerative drive having a motor, a multilevel converter, a multilevel inverter, and a controller operatively connected to the multilevel converter and the multilevel inverter, the method comprising:
    applying, by the controller, bipolar modulation to the multilevel converter of the multilevel regenerative drive during a first period;
    applying, by the controller, unipolar modulation to at least one phase-leg of the multilevel converter of the multilevel regenerative drive during a second period, wherein the first period and the second period are different periods that partially overlap; and
    applying, by the controller, at least one of unipolar modulation and bipolar modulation to the multilevel inverter of the multilevel regenerative drive;
    wherein the applying at least one of unipolar modulation and bipolar modulation to the multilevel inverter comprises:
        applying bipolar modulation to the multilevel inverter during acceleration of an elevator car from zero speed of the elevator car to about 75% of a rated speed of the elevator car, and
        applying unipolar modulation to the multilevel inverter (a) during acceleration of the elevator car from the about 75% of the rated speed of the elevator car to a constant speed of the elevator car and (b) throughout movement of the elevator car at the constant speed, wherein the constant speed comprises the rated speed.

2. The method of claim 1, wherein the applying at least one of unipolar modulation and bipolar modulation to the multilevel inverter comprises applying bipolar modulation to the multilevel inverter during a third period, and applying unipolar modulation to the multilevel inverter during a fourth period, and
    wherein at least two of the second period, the third period, and the fourth period overlap partially or entirely.

3. The method of claim 1, further comprising providing the multilevel converter and the multilevel inverter with a neutral-point-clamped topology, a T-type topology, or a reverse blocking insulated gate bipolar transistor based topology.

4. A control system for a multilevel regenerative drive having a motor, comprising:
    a multilevel converter operatively connected to a power source, the multilevel converter having a plurality of devices in selective communication with the power source;
    an multilevel inverter operatively connected to the motor of the mechanical system, the multilevel inverter and the converter connected to each other, and the multilevel inverter having a plurality of devices in selective communication with the motor; and
    at least one controller in communication with the multilevel converter and the multilevel inverter, the at least one controller being configured to apply bipolar modulation to the multilevel converter of the multilevel regenerative drive during a first period, apply unipolar modulation to at least one phase-leg of the multilevel converter of the multilevel regenerative drive during a second time period, and apply at least one of unipolar modulation and bipolar modulation to the multilevel inverter of the multilevel regenerative drive, wherein the first period and the second period are different periods that partially overlap;
    wherein the applying at least one of unipolar modulation and bipolar modulation to the multilevel inverter by the at least one controller comprises:
        applying bipolar modulation to the multilevel inverter during acceleration of an elevator car from zero speed of the elevator car to about 75% of a rated speed of the elevator car, and
        applying unipolar modulation to the multilevel inverter (a) during acceleration of the elevator car from the about 75% of the rated speed of the elevator car to a constant speed of the elevator car and (b) throughout movement of the elevator car at the constant speed, wherein the constant speed comprises the rated sped.

5. The control system of claim 4, wherein the applying at least one of unipolar modulation and bipolar modulation to the multilevel inverter by the at least one controller comprises applying bipolar modulation to the multilevel inverter during a third period, and applying unipolar modulation to the multilevel inverter during a fourth period,
    wherein at least two of the second period, the third period, and the fourth period overlap partially or entirely.

6. The control system of claim 4, wherein the multilevel converter and the multilevel inverter have a neutral-point-clamped, T-type, or reverse blocking insulated gate bipolar transistor based topology.

7. The control system of claim 4, wherein the mechanical system is an elevator system.

8. An elevator system, comprising:

an elevator car disposed in a hoistway;

a motor operatively connected to the elevator car, the motor generating a thrust force to move the elevator car within the hoistway;

a power source operatively connected to the motor, the power source supplying power to the motor;

a multilevel converter operatively connected to the power source, the multilevel converter having a plurality of devices in selective communication with the power source;

an multilevel inverter operatively connected to the motor, the multilevel inverter and the multilevel converter connected to each other, and the multilevel inverter having a plurality of devices in selective communication with the motor; and at least one controller in communication with the multilevel converter and the multilevel inverter of the multilevel regenerative drive, the at least one controller being configured to apply bipolar modulation to the multilevel converter of the multilevel regenerative drive during a first period, apply unipolar modulation to at least one phase-leg of the multilevel converter of the multilevel regenerative drive during a second time period, and apply at least one of unipolar modulation and bipolar modulation to the multilevel inverter of the multilevel regenerative drive, wherein the first period and the second period are different periods that partially overlap;

wherein the applying at least one of unipolar modulation and bipolar modulation to the multilevel inverter by the at least one controller comprises:

applying bipolar modulation to the multilevel inverter during acceleration of an elevator car from zero speed of the elevator car to about 75% of a rated speed of the elevator car; and applying unipolar modulation to the multilevel inverter (a) during acceleration of the elevator car from the about 75% of the rated speed of the elevator car to a constant speed of the elevator car and (b) throughout movement of the elevator car at the constant speed, wherein the constant speed comprises the rated speed.

9. The elevator system of claim 8, wherein the source and the motor have a plurality of phases, wherein each of the multilevel converter and the multilevel inverter has a phase-leg for each phase of the plurality of phases of the power source and the motor, wherein the phase-leg includes at least three levels and at least four insulated gate bipolar transistors arranged in a neutral-point-clamped, T-type, or reverse blocking insulated gate bipolar transistor based topology.

10. The elevator system of claim 8, wherein the at least one controller is further configured to apply unipolar modulation to the multilevel converter while simultaneously applying bipolar modulation to the multilevel inverter.

* * * * *